United States Patent Office 2,996,220
Patented Aug. 15, 1961

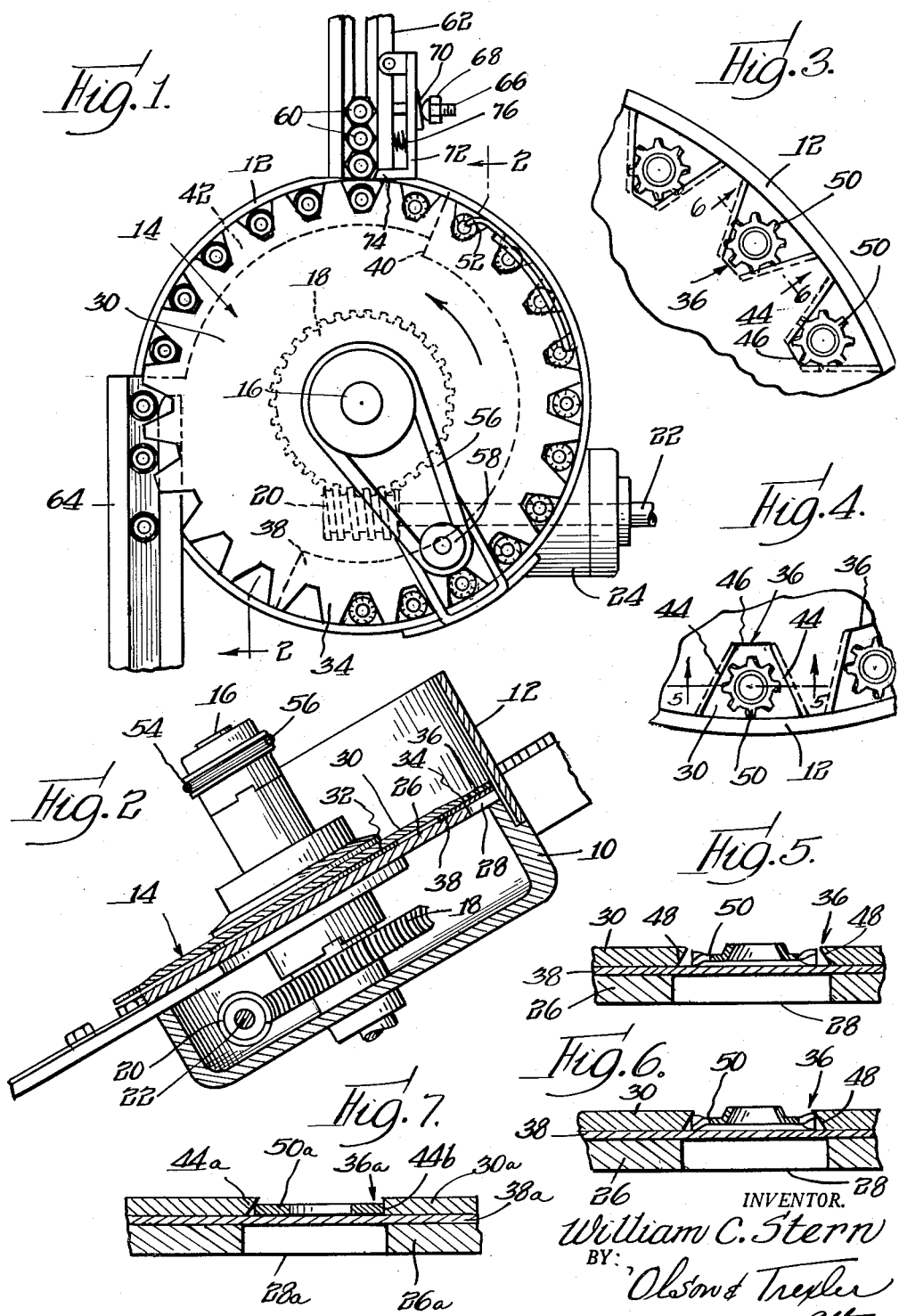

2,996,220
WASHER FEEDING APPARATUS
William C. Stern, Park Ridge, Ill., assignor to Illinois Tool Works, Chicago, Ill., a corporation of Illinois
Filed June 4, 1956, Ser. No. 589,271
5 Claims. (Cl. 221—263)

This invention is concerned generally with the art of feeding washers and assembling fasteners therewith, and more particularly with an improved washer feeding hopper.

It is an object of this invention to provide an improved hopper for feeding washers from a random mass.

More particularly, it is an object of this invention to provide a hopper of the inclined rotary disc type for feeding washers from a random mass, and including simple, integral means for preventing accidental dislodgment of washers from proper position on the disc.

More specifically, it is an object of this invention to provide a rotary disc type of washer feeding device having edge opening recesses which are undercut or beveled in order positively to retain the washers in the disc during feeding.

Other and further objects and advantages of the present invention will be apparent from the following description when taken in connection with the accompanying drawings, wherein:

FIG. 1 is a top view of a washer feeding and assembling mechanism constructed in accordance with the principles of this invention;

FIG. 2 is a cross sectional view thereof taken substantially along the line 2—2 of FIG. 1;

FIG. 3 is an enlarged fragmentary view of the washer feeding disc near the periphery thereof adjacent the upper portion of the disc;

FIG. 4 is a view similar to FIG. 3 taken adjacent the lower edge of the disc;

FIG. 5 is a cross sectional view taken along the line 5—5 of FIG. 4;

FIG. 6 is a view taken along the line 6—6 of FIG. 3; and

FIG. 7 is a view similar to FIG. 6 showing a modified form of the washer feeding disc.

Referring now in greater particularity to the drawings, and first to FIGS. 1 and 2, there will be seen a washer feeding and assembling device comprising a generally cup shaped base or housing 10 having an upstanding cylindrical retaining wall 12 partially encircling the base. A disc assembly 14 is mounted adjacent the upper edge of the base 10 for rotation on a shaft 16. This shaft is driven by a worm wheel 18 thereon, the worm wheel being driven by a worm 20 on a shaft 22 extending from the side of the base or housing 10 through a boss 24 having suitable bearings therein.

The disc assembly 14 is inclined from the horizontal, and includes a relatively thick lower disc 26 having edge opening recesses 28 therein. The disc assembly 14 is completed by an upper disc 30 spaced above the lower disc 26 by an intervening washer or disc 32. The upper disc 30 is provided with a relatively thin or shallow outer edge portion or circumference 34, and outwardly opening edge recesses 36 or cutouts are formed in this edge portion.

An arcuate washer supporting plate 38 lies between the upper and lower discs 30 and 26 throughout the lower portion and the ascending side of the disc assembly (it being understood that the disc assembly rotates in the counterclockwise direction as viewed in FIG. 1). This washer supporting plate 38 is terminated at 40, and an arcuate underlying supporting plate 42 continues for some distance from this plate, the plate 42 completely underlying the disc assembly 14.

The edge opening recesses 36 are equally arcuately spaced about the periphery of the disc 30, and as shown in the drawings the recesses preferably are defined by diverging straight edges or sides 44 having a straight inner edge termination 46. Stated otherwise, the recesses 36 are substantially the shape of an isosceles triangle with the apex removed. In addition, the sides or edges 44 are undercut, specifically beveled, as is shown at 48. Thus, the area or location immediately beyond the end 40 of the support plate 38, where the washers drop off the plate 38 onto the plate 42, constitutes a washer unloading or discharge station where the washers are removed from the disc 30.

When a random mass of washers is dumped on top of the disc assembly 14, the mass naturally will rest adjacent the lower portion of the disc. The washers 50 readily pass gravitationally into the recesses 36. As the washers are raised by rotation of the disc, the washers settle toward the inner edge 46 of the recesses, and hence become more or less wedged beneath the beveled surfaces 48. The manner in which the washers first fit within the recesses is shown in FIG. 5, and the wedging in place upon rotation of the disc assembly is shown in FIG. 6. Thus, the washers are located precisely, and cannot be accidentally displaced from the recesses.

Substantially any type of washer can be handled in this manner, and twisted tooth lock washers are shown in the drawings. In the case where an asymmetric washer is used, such as the type shown in the drawing having a central conical skirt, it will be apparent that a washer which is upside down cannot settle into position within the recess to be retained by the undercut or beveled edges 48. Hence, such a washer will return gravitationally to the random mass at the bottom of the hopper. To assist such gravitational return, there is provided a finger 52 (FIG. 1) overlying the periphery of the disc assembly near the upper edge thereof. Any washers which are inverted, or which are not seated in the recesses are displaced by this finger.

A pulley 54 is mounted adjacent the top of the shaft 16, and acts through a round rubber belt 56 to drive a stirring mechanism 58 adjacent the lower edge of the disc assembly. This stirring mechanism agitates the random mass of washers dumped in the hopper, and prevents the washers from clumping together, such as might otherwise happen by entangling of the locking teeth.

As the washers approach the upper portion of the disc assembly, they pass beyond the edge 40 of the washer supporting plate 38, and drop into the recesses 28 in the lower disc 26, thereafter being supported by the underlying plate 42. Nut elements 60 having undersurfaces complementary in shape to the washers 50 are gravitationally fed down a chute 62 extending radially in toward the upper edge of the disc assembly. The nut elements drop on top of washers in the recesses 36, 28, and are gravitationally telescoped therewith. The telescoped nut elements and washers are carried by the disc assembly to a tangentially oriented feed chute 64, and the telescoped nut elements and washers pass gravitationally down this chute to a staking mechanism (not shown) for deforming a part of each telescoped nut element and washer in order to retain the nut element and washer in permanently assembled relation.

Associated with the chute 62 there is provided a slide (not shown) which is spring urged against the periphery of the disc assembly 14. A stud 66 extends laterally from this slide, and is provided with a cam follower nut 68 engageable with a cam or ramp 70 on the side of a gate mechanism 72 having a nut retaining finger 74. A compression spring 76 urges the gate outwardly to maintain the cam or ramp 70 against the cam follower 68. Whenever the slide engages the periphery of the disc assembly, or engages a washer in a slot 28, the slide is held in retracted position, and the finger 74 of the gate is retracted by the spring 76 a sufficient distance to allow a nut to pass into the disc recesses 36 and underlying recesses 28. However, when no washer is present in a recess, the slide projects part way into the recess. This causes the cam follower 68 to act upon the cam or ramp 70 to pivot the gate mechanism so that the finger 74 blocks the lowermost nut element in the chute 62. Thus, no nut element is released.

In accordance with the invention as heretofore shown and described, both of the lateral, diverging edges 44 of each recess 36 are undercut. In some instances it might be found desirable to undercut only one of the edges, and such a modification is shown in FIG. 7 wherein the edge 44a is undercut, all other similar parts being identified with similar numerals with the addition of the suffix a. The opposite edge 44b will be seen to be straight up and down rather than undercut. The washers handled by the apparatus herein shown and described can be twisted tooth lock washers as heretofore shown and described, or they can be flat washers as shown at 50a in FIG. 7, or they can be washers of any other type, it being understood that the thickness of the edge portion of the disc 30, 30a, or the like would be adjusted to the necessary height. To this end, it is contemplated that the upper disc 30 could be removed and replaced by another disc of different thickness.

It will be apparent that there has hereby been provided an improved structure for feeding washers from a random mass, and more particularly a structure wherein the washers will not accidentally be dislodged from the edge opening recesses. A higher percentage of recesses thus may be expected to be occupied by washers upon approaching the nut element feed chute, and accordingly a greater number of assemblies will be produced, and the efficiency of the assembling machine will thereby be higher.

The specific embodiments of the invention as herein shown and described will be understood as being by way of illustration only. Various changes in structure will no doubt occur to those skilled in the art, and will be understood as forming a part of this invention insofar as they fall within the spirit and scope of the appended claims.

The invention is hereby claimed as follows:

1. In apparatus for supplying an orderly procession of relatively thin small parts from a random mass of small parts, the combination of a rotary disc mounted in an inclined position for rotation in a given direction, said disc defining an annular face area on the upper side of the peripheral side edge of the disc, means for supporting a random mass of small parts in overlying immediate contact with at least a substantial arcuate portion of said annular upper face area of the disc, the outer periphery of said disc comprising a series of circumferentially spaced cutouts having with respect to the direction of rotation of the disc a generally straight leading side edge and a generally straight trailing side edge extending radially outward in diverging relation to each other, a small parts support element underlying an arcuate portion of said disc defining said cutouts, the leading side edge and the trailing side edge of each cutout being progressively undercut from said annular upper face area toward the lower side of the disc to define small parts retaining surfaces which are inclined toward each other away from perpendiculars to adjacent portions of said upper face area, the portions of said upper face area intervening between said cutouts being generally flat and flush with the upper edges of the adjacent cutouts, said cutouts and said intervening upper face area portions being fully exposed upwardly in an axial direction with respect to said disc, and means defining a small parts discharge station located along the circular path of said cutouts.

2. In apparatus for supplying an orderly procession of small parts from a random mass of small parts, the combination of a rotary disc mounted in an inclined position for rotation in a given direction, an annular portion of said disc defining an annular upper face area, a support element underlying a segment of said annular disc portion, said annular disc portion having an annular series of circumferentially spaced cutouts therein positioned to move across said support element upon rotation of said disc, said disc having edges at least partially bounding each of said cutouts, the disc edges bounding each cutout including a rear disc edge portion forming the rear boundry for the adjacent cutout with respect to the rotary movement of the cutout, the rear disc edge portion forming the rear boundry of each of said cutouts being progressively undercut from said upper frace area of the disc toward the lower side of the disc, said upper face area of the disc including portions thereof intervening between the adjacent cutouts and being substantially flat and flush with the disc edges bounding the adjacent cutouts, said intervening surface portions of said disc and the upper extremities of said cutouts being fully exposed upwardly to immediately underlie a random mass of small parts placed on said disc, and means defining an unloading station located along the circular path of said cutouts.

3. In apparatus for supplying an orderly procession of washers from a random mass of washers, the combination of a rotary disc positioned to support a random mass of washers, said disc defining an annular face surface on the upper side of the peripheral side edge of the disc, means for locating a random mass of washers in overlying contact with at least a substantial arcuate portion of said annular upper face surface on the disc, the outer periphery of said disc having a series of circumferentially spaced cutouts therein, each of said cutouts being bounded at least in part by two opposed and generally straight side edges of the disc disposed at an angle relative to each other and diverging outwardly with respect to the center of the disc, a washer support element underlying an arcuate portion of said disc having said cutouts therein, said disc edges bounding each of said cutouts being undercut to exert a retaining action on a washer lodged in the cutout, said upper face surface including portions thereof intervening between said cutouts and being generally flat and flush with the upper edges of the disc bounding the adjacent cutouts, said intervening upper face surface portions of said disc and said recesses except for portions thereof underlying the undercut adjacent edge portions of the disc being exposed upwardly so that the upper extremities of said cutouts and the intervening upper surface portions of the disc immediately underlie a random mass of washers on said disc, and means defining a small parts discharge station located along the circular path of said cutouts.

4. In apparatus for supplying an orderly procession of washers from a random mass of washers, the combination of a rotary disc supported for rotation in a given direction, an annular portion of said disc defining an annular upper face surface, said annular portion of said disc having an annular series of circumferentially spaced recesses therein opening upwardly through said upper face surface, said disc including edges at least partially bounding each of said recesses, the rear extremity of each cutout with respect to the rotary movement of the disc being defined by a disc edge which is progressively undercut with reference to said upper face surface, said upper face surface including portions thereof intervening between said recesses and being substantially flat and flush with the disc edges bounding the adjacent recesses, the upper extremities of said recesses and said intervening upper face surface portions of said disc being exposed upwardly for direct exposure to a random mass of washers placed on said disc, and washer receiving means located along the circular path of said recesses.

5. In washer feeding apparatus, the combination of a rotary disc positioned to support a random mass of washers and having therein an annular series of circumferentially spaced recesses each of which is bounded on opposite sides by two generally straight edge portions of the disc disposed at an angle relative to each other and diverging outwardly with respect to the center of the disc, means for supporting a random mass of washers in overlying relation to at least a portion of said disc having said recesses therein, said disc including portions thereof intervening between said recesses, said intervening disc portions defining upper face surfaces which are substantially flat and flush with the edge portions of the disc bounding the adjacent recesses, said generally straight edge portions of said disc bounding opposite sides of each of said recesses being undercut with reference to the upper side of the disc, said upper face surfaces of said intervening disc portions and said recesses except for the portions thereof underlying the undercut adjacent edge portions of the disc being exposed upwardly to provide an immediately contiguous relationship of the upper extremities of the said recesses and said intervening upper surface areas of said disc with a random mass of washers supported on said disc, and small parts receiving means located along the circular path of said recesses.

References Cited in the file of this patent

UNITED STATES PATENTS

| | | |
|---|---|---|
| 2,180,836 | Risser | Nov. 21, 1939 |
| 2,273,782 | Irwin | Feb. 17, 1942 |
| 2,273,783 | Irwin | Feb. 17, 1942 |
| 2,321,548 | Hanneman | June 8, 1943 |
| 2,711,550 | Nielsen | June 28, 1955 |